Dec. 9, 1924.  
M. BALDWIN  
VEHICLE TOP  
Filed Oct. 31, 1921  
1,518,128
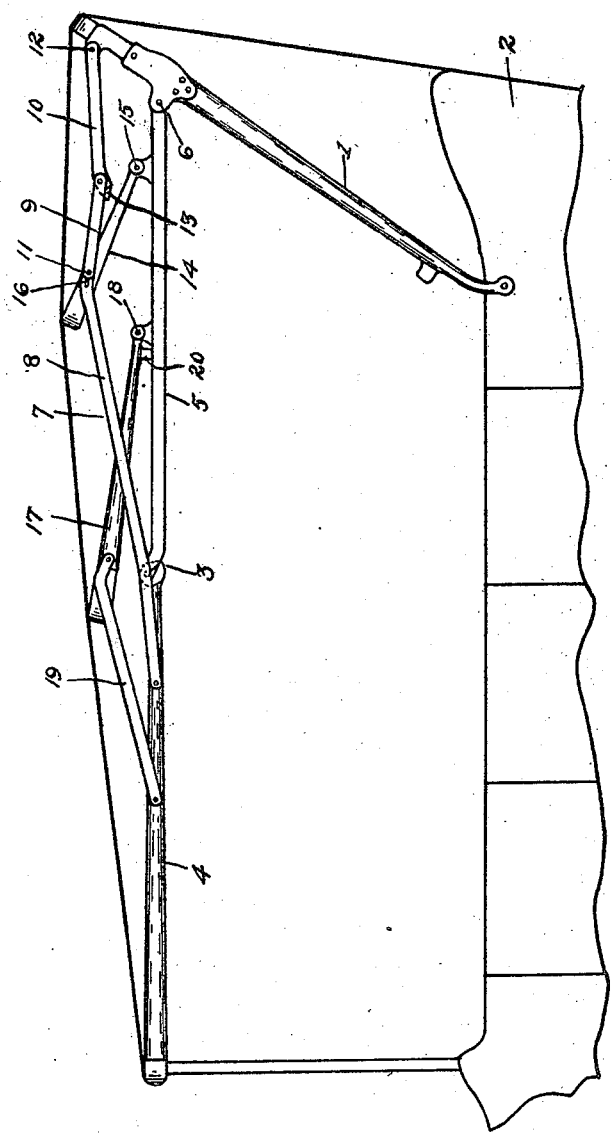
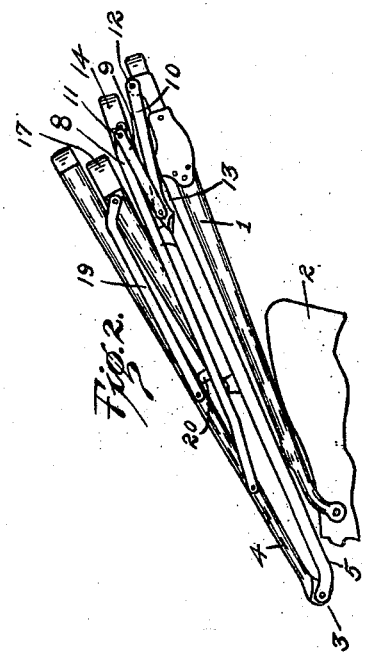
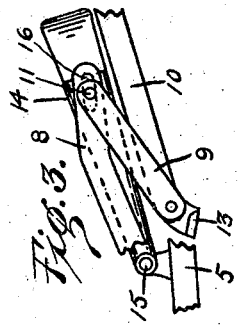
Inventor  
Martin Baldwin
By Whittemore Hulbert Whittemore  
+Belknap    Attorneys Patented Dec. 9, 1924.

1,518,128

UNITED STATES PATENT OFFICE.

MARTIN BALDWIN, OF DETROIT, MICHIGAN, ASSIGNOR, BY MESNE ASSIGNMENTS, TO THE BREWER-TITCHENER CORPORATION, OF CORTLAND, NEW YORK, A CORPORATION OF NEW YORK.

VEHICLE TOP.

Application filed October 31, 1921. Serial No. 511,685.

*To all whom it may concern:*

Be it known that I, MARTIN BALDWIN, a citizen of the United States of America, residing at Detroit, in the county of Wayne and State of Michigan, have invented certain new and useful Improvements in Vehicle Tops, of which the following is a specification, reference being had therein to the accompanying drawings.

This invention relates to folding tops for vehicles and has for one of its objects the provision of a top which will provide clear vision to the occupants of the vehicle and which is adapted to be compactly folded. Another object is the provision of means for facilitating the folding of the top. With these objects, as well as others, in view, the invention resides in the novel features of construction as more fully hereinafter set forth.

In the drawings:

Figure 1 is a side elevation of a top embodying my invention and in extended position, showing in outline the fabric covering;

Figure 2 is a side elevation of the top in folded position;

Figure 3 is an enlarged view of a detail.

1 is the main bow pivotally connected at the lower ends of its standards to the vehicle body 2 and extending upwardly and rearwardly from its pivots to a position such that its upper end is substantially vertically above the rear end of the vehicle body. 3 is a bipartite outrigger bow comprising the forward and rearward members 4 and 5 respectively which are pivotally connected to each other by a hinge of the elbow or lock type. The rear end of the rearward member 5 is pivoted at 6 to a lug upon the main bow 1 while the forward end of the forward member 4 is adapted to be secured to the standard of a windshield frame after any usual manner.

For supporting and bracing the outrigger bow 3 in extended position there is the linkage 7 connecting the forward member 4 to the main bow 1. This linkage comprises the front link 8 pivotally connected at its forward end to the forward member 4 and also the forward and rearward toggle links 9 and 10 respectively pivotally connected to each other, the forward toggle link being connected by the pivot 11 to the rear end of the front link 8 and the rearward toggle link being pivotally connected at 12 to a lug upon the main bow 1 above the pivot 6 for the outrigger bow. The rearward toggle link 10 has at its forward end the transverse ear 13 adapted to engage the lower edge of the forward toggle link 9 and thereby limit the relative rotation of these two links in one direction. With this arrangement, the front link 8 and the forward and rearward toggle links 9 and 10 respectively effectually support and brace the outrigger bow upon the main bow in extended position as shown in Figure 1.

The front link 8 has at its rear end the longitudinal elongated opening 16 through which the pivot 11 passes whereby the top bows may be folded into compact relation.

For facilitating the folding of the top, I have provided means connected to the pivot 11 between the front link 8 and the forward toggle link 9 whereby this pivot is forced away from the rearward member 5 of the outrigger bow during the first portion of the folding of the top. Specifically 14 is an intermediate bow pivotally connected at 15 to a lug upon the rearward member 5 of the outrigger bow in rear of and also connected to the pivot 11, the arrangement being such that during the first portion of the folding operation, it will compel the pivot to move upwardly and away from the rearward member. Also the toggle links will naturally fold in the right direction to permit of folding the top into compact relation. With this arrangement, it is to be noted that the intermediate bow 14 does not perform any function of supporting or bracing the front member 4 of the outrigger bow, but it does facilitate the folding of the top so that it will not be necessary for the party folding the top to additionally break the link joints in their correct directions.

17 is an extension bow pivoted at 18 to a lug upon the rearward member 5 of the outrigger bow forward of the pivot 15 of the intermediate bow. 19 is a link pivoted at its forward end to the forward member 4 of the outrigger bow forward of the pivot connecting the link 8 to the forward member, this link 19 being pivotally connected to the extension bow. The extension bow has the lug 20 at its rear end which is adapted to engage the upper edge of the rearward member 5 of the outrigger bow thereby limiting the forward and downward swinging of the extension bow relative to the rearward member, and as a consequence the forward member 4 is additionally supported and braced.

From the above description, it will be readily seen that I have provided a folding top which as shown in Figure 2 can be compactly folded and in which means is provided for breaking the joints of the bracing linkage between the forward member of the outrigger bow and the main bow in the desired direction without the necessity of individually breaking these joints during the folding. Further, the foldable top when erected conceals the framework and allows the occupants of the rear seat unobstructed vision.

What I claim as my invention is:

1. A folding top for vehicles, comprising a main bow, a bipartite outrigger bow pivotally connected to said main bow, linkage pivotally connecting said bipartite outrigger bow to said main bow including toggle links foldable in one direction only, and a front link, an intermediate bow upon said bipartite outrigger bow, a common pivot for said toggle links and front link movable by said intermediate bow for facilitating the folding of the top, an extension bow pivotally conected to the rearward member of said outrigger bow, a link pivotally connected to said extension bow and to the forward member of said outrigger bow, and means upon said extension bow and engageable with the rearward member of said outrigger bow for limiting the rotation of said extension bow relative to the rearward member of said outrigger bow in one direction.

2. A folding top for vehicles, comprising a main bow, a bipartite outrigger bow member connected to said main bow, toggle links connected to said main bow, a link connected to the forward member of said outrigger bow, an intermediate bow connected to the rear member of said outrigger bow, a pivotal connection between the adjacent ends of said link and said toggle links carried by said intermediate bow, and an auxiliary bow also connected to the rear member of said outrigger bow and supported from the forward member of said outrigger bow.

3. A vehicle top, comprising a main arm adapted to be pivoted to a vehicle body and to extend rearwardly and upwardly therefrom, a bi-partite outrigger having the rear section pivoted to the upper portion of said main arm, a pair of spaced auxiliary bow sockets pivoted to the rear section of said outrigger and adapted to extend forwardly and upwardly therefrom, a link connecting the front auxiliary bow socket to the front section of said outrigger, a second link connecting the rear auxiliary bow socket to the front section of said outrigger, and a third link connecting the rear auxiliary bow socket to the main arm at a point above the pivot of the bipartite outrigger and said main arm.

In testimony whereof I affix my signature.

MARTIN BALDWIN.